United States Patent [19]
Tani et al.

[11] Patent Number: 5,904,987
[45] Date of Patent: May 18, 1999

[54] RESISTANCE MATERIAL COMPOSITION AND SINGLE AND MULTILAYER CERAMIC SUBSTRATES EMPLOYING THE SAME

[75] Inventors: Hiroji Tani, Nagaokakyo; Keisuke Nagata, Oumihachiman, both of Japan

[73] Assignee: Murata Manufacturing Co., Ltd., Japan

[21] Appl. No.: 08/738,280

[22] Filed: Oct. 25, 1996

[30] Foreign Application Priority Data

Oct. 25, 1995 [JP] Japan ..................................... 7-302055

[51] Int. Cl.⁶ ........................... B32B 15/04; B32B 17/06; B32B 18/00; H01C 1/012

[52] U.S. Cl. ........................... 428/432; 428/702; 428/901; 428/210; 338/308; 252/512; 252/515; 252/521.3; 252/521.4; 252/520.2

[58] Field of Search ..................... 428/469, 472, 428/701, 702, 901, 209, 210, 432, 433; 252/512, 515, 521.3, 521.4, 520.2; 338/308, 309, 307

[56] References Cited

U.S. PATENT DOCUMENTS

| | | |
|---|---|---|
| 3,341,363 | 9/1967 | Owen . |
| 3,673,117 | 6/1972 | Schroeder et al. . |
| 4,053,866 | 10/1977 | Merz et al. . |
| 4,060,663 | 11/1977 | Merz et al. . |
| 4,087,778 | 5/1978 | Merz et al. . |
| 4,172,922 | 10/1979 | Merz et al. . |
| 4,464,420 | 8/1984 | Taguchi et al. . |
| 4,514,321 | 4/1985 | Siuta . |
| 4,949,065 | 8/1990 | Watanabe et al. . |
| 5,345,212 | 9/1994 | Brown . |
| 5,601,638 | 2/1997 | Fukuda et al. . |
| 5,624,782 | 4/1997 | Hayakawa et al. . |

*Primary Examiner*—Steven P. Griffin
*Attorney, Agent, or Firm*—Ostrolenk, Faber, Gerb & Soffen, LLP

[57] ABSTRACT

Disclosed is a resistance material composition comprising at least one resistance material of Ti, Mo and W, and an inorganic binder. The composition can be baked along with a multi-layered ceramic substrate (especially, a low-temperature-sintering, multi-layered ceramic substrate) to be integrated with Cu or the like electrodes, thereby forming built-in resistors with good characteristics within the substrate.

13 Claims, No Drawings

… …

RESISTANCE MATERIAL COMPOSITION AND SINGLE AND MULTILAYER CERAMIC SUBSTRATES EMPLOYING THE SAME

BACKGROUND OF THE INVENTION

The present invention relates to a resistance material composition and, more particularly, to a resistance material composition capable of being baked in a neutral or reducing atmosphere along with a ceramic substrate, especially, with a low-temperature-sintering substrate.

BACKGROUND OF THE INVENTION

In general, a ceramic substrate comprising alumina, zirconia or the like is provided with circuit patterns for electrodes, resistors, etc., in order that various electronic parts can be mounted thereon. Electrodes are generally formed on the substrate by screen-printing a noble metal paste comprising Ag, an Ag—Pd alloy or the like followed by baking the thus-printed paste in air.

In order to obtain small-sized, high-density electronic products, multi-layered substrates produced by laminating a plurality of substrate materials have been developed. In such multi-layered substrates, conductors can be three-dimensionally disposed. However, if inner layers are wired and laminated on conventional alumina substrates, high-melting-point metals having high specific resistivity, such as W (tungsten), Mo (molybdenum), etc., must be used as conductor materials since alumina substrates are sintered at high temperatures. Such substrates are high-temperature-sintering substrates. As a result of the use of such metal as conductors, the resistors to be formed have high resistance values. Therefore, the prior art was problematic in that the use of the products produced is limited.

In order to solve this problem, low-temperature-sintering substrates (for example, ceramic/glass composite substrates) which can be sintered at low temperatures of not higher than about 1000° C. and that can be constructed along with built-in electrode materials such as Ag, Ag—Pd or the like, have been utilized.

Electrode materials that are applicable to such low-temperature-sintering substrates, include base metal materials such as Cu, Ni, etc., in addition to the above-mentioned noble metal materials such as Ag, Ag—Pd, etc.

When a multi-layered substrate having electrodes of Ag, Ag—Pd or the like is formed, in general, the substrate and the electrodes are baked together in air. When a multi-layered substrate having electrodes of Cu, Ni or the like is formed, in general, the substrate and the electrodes are baked together in a neutral or reducing atmosphere.

Accordingly, where a low-temperature-sintering, multi-layered substrate to be integrated with electrodes of Cu, Ni or the like is produced, it is desirable that the resistance material composition (i.e., the resistance paste) which is to form inner resistors (that is, built-in resistors) on the substrate can also be baked in such a neutral or reducing atmosphere.

At present, for example, a resistance material composition comprising $RuO_2$ has been proposed as the resistance material composition to be used together with an electroconductive paste of Ag, Ag—Pd or the like to form electrodes, while a resistance material composition comprising $MoSi_2$—$TaSi_2$, molybdates or the like has been proposed as that to be used together with an electroconductive paste of Cu, Ni or the like to form electrodes. In fact, however, there is not known any practicable resistance material composition capable of being baked along with a low-temperature-sintering, multi-layered substrate to form in the substrate built-in resistors with desired characteristics.

SUMMARY OF THE INVENTION

The present invention is designed to solve the above-mentioned problems, and its object is to provide a resistance material composition which can be baked along with a ceramic substrate (especially a low-temperature-sintering ceramic substrate) intended to be integrated with Cu or other electrodes, and which can form resistors having widely-varying resistance values in a multi-layered ceramic substrate (especially a low-temperature-sintering, multi-layered ceramic substrate).

Specifically, the present invention provides a resistance material composition comprising at least one resistance material of Ti, Mo and W, and an inorganic binder, by which the above-mentioned object is attained.

The resistance material composition of the invention, which comprises at least one Ti, Mo and W resistance material and an inorganic binder, can be used for forming resistors in or on ceramic substrates.

As one embodiment of the present invention, the resistance material composition comprises the resistance material and the inorganic binder in a ratio by weight of from about 50 to less than 100 parts of the resistance material to from more than 0 to about 50 parts of the inorganic binder.

As another embodiment of the invention, the inorganic binder is a mixture of B—Si—Ba—Ca—Al glass frit and composition oxides that are common to the ceramic substrate to which the composition of the invention will be applied, while being nearly the same in composition as those constituting the ceramic substrate.

DETAILED DESCRIPTION OF THE INVENTION

The inorganic binder in the resistance material composition of the present invention functions to vary the resistance value of the resistor to be made of the composition. Therefore, by varying the ratio of the resistance material (Ti, Mo, W) to the inorganic binder in the resistance material composition of the invention within a predetermined range, the composition can be used in forming resistors having a desired resistance value in a low-temperature-sintering, multi-layered substrate intended to be integrated with Cu electrodes or the like.

The ceramic substrates to which the resistance material composition of the present invention is applied to form resistors therein are not specifically limited. For example, however, it is desirable to apply the composition of the invention to a low-temperature-sintering substrate comprised of about 30% by weight of BaO, 5% by weight of $Al_2O_3$, about 60% by weight of $SiO_2$, 2% by weight of CaO and about 3% by weight of $B_2O_3$ (hereinafter referred to as substrate A) or to a low-temperature-sintering substrate comprised of about 15% by weight of BaO, about 15% by weight of SrO, about 30% by weight of $SiO_2$, about 30% by weight of $ZrO_2$ and about 10% by weight of $Al_2O_3$ (hereinafter referred to as substrate B). The composition applied to such a substrate can be baked along with the substrate to form resistors with good characteristics in the substrate. In this case, the present invention produces extremely meaningful results. The above-mentioned substrate A can be pre-baked and baked in a nitrogen-steam atmosphere comprising nitrogen as a carrier gas and containing minor amounts of oxygen and hydrogen (N$_2$: from about 99.7 to 99.8%) at from 850 to 1000° C., and the resistance material composition of the present invention can be baked along with such a multi-layered substrate.

It is desirable that the ratio by weight of the resistance material (Ti, Mo, W) to the inorganic binder is such that the resistance material is from about 50 to less than 100 parts while the inorganic binder is from more than 0 to about 50 parts. This is because when the proportion of the inorganic binder is more than about 50%, the resistance value of the resistor to be formed will greatly increase to 1 GΩ or more and a resistor with such a high resistance value is not practical. Preferably the amount of resistance material is about 60 to 80%.

It is also desirable that the inorganic binder in the resistance material composition of the present invention is a combination of B—Si—Ba—Ca—Al glass frit and composition oxides that are common to the ceramic substrate to which the composition of the invention shall be applied, while being nearly the same as those constituting the ceramic substrate. If the composition of the invention contains such inorganic binder, the effect of the present invention to form resistors having desired resistance values can be ensured more reliably. The B—Si—Ba—Ca—Al glass frit may additionally contain oxides of Nb (niobium), K (potassium), etc.

Where the resistance material composition of the present invention is baked along with a ceramic substrate, the baking temperature may be varied within the range of from about 850 to 1000° C., whereby the level of the resistance values of the resistors to be formed can be appropriately controlled.

Next, examples of the present invention are described below, which demonstrate the characteristics of the invention in more detail. However, these examples do not whatsoever restrict the scope of the present invention.

EXAMPLES

On a green sheet of substrate A (low-temperature-sintering substrate) comprised of 30% by weight of BaO, 5% by weight of Al$_2$O$_3$, 60% by weight of SiO$_2$, 2% by weight of CaO and 3% by weight of B$_2$O$_3$, an electroconductive paste obtained by kneading Cu powder and an organic vehicle, and a resistance paste obtained by kneading a resistance material composition comprising at least one of Ti, Mo and W and an inorganic binder, along with an organic vehicle were printed.

As shown in Table 1, each composition comprised at least one of Ti, Mo and W, and, as the inorganic binder, B—Si—Ba—Ca—Al glass frit to which had been added K$_2$O and Nb$_2$O$_5$ and/or the composition oxides common to the low-temperature-sintering substrate A to which the composition of the invention was applied. The frit had a composition which when set forth as oxides was 25.9% by weight of B$_2$O$_3$, 19.5% by weight of SiO$_2$, 28.5% by weight of BaO, 5.8% by weight of CaO, 10.0% by weight of Al$_2$O$_3$, 2.8% by weight of K$_2$O and 7.5% by weight of Nb$_2$O$_3$. The compositional oxides were a combination of 3% by weight of B$_2$O$_3$, 60% by weight of SiO$_2$, 30% by weight of BaO, 2% by weight of CaO and 5% by weight of Al$_2$O$_3$.

TABLE 1

| Sample No. | Resistance Material | Resistance Material (wt. %) | Glass Frit | Composition Oxides | Resistance Value (Ω) |
|---|---|---|---|---|---|
| *1 | Ti | 100 | 0 | 0 | 39 |
| 2 | Ti | 95 | 5 | 0 | 43 |
| 3 | Ti | 70 | 30 | 0 | 3.4K |
| 4 | Ti | 70 | 20 | 10 | 4.1K |
| 5 | Ti | 50 | 50 | 0 | 27K |
| *6 | Ti | 48 | 52 | 0 | 1 G or more |
| *7 | Mo | 100 | 0 | 0 | 3 |
| 8 | Mo | 95 | 5 | 0 | 3.4 |
| 9 | Mo | 70 | 30 | 0 | 631 |
| 10 | Mo | 60 | 30 | 10 | 34K |
| 11 | Mo | 50 | 50 | 0 | 5.8K |
| *12 | Mo | 48 | 52 | 0 | 1 G or more |
| *13 | W | 100 | 0 | 0 | 16 |
| 14 | W | 95 | 5 | 0 | 18 |
| 15 | W | 70 | 30 | 0 | 1.3K |
| 16 | W | 70 | 20 | 10 | 75K |
| 17 | W | 50 | 50 | 0 | 68K |
| *18 | W | 48 | 52 | 0 | 1 G or more |

Next, each green sheet was blanked, the resulting pieces were laminated under pressure, and the resulting laminate was pre-baked and baked in a nitrogen-steam atmosphere comprising nitrogen as the carrier gas and containing minor amounts of oxygen and hydrogen (N$_2$: from 99.7 to 99.8%) at from 850 to 1000° C. Thus were produced various low-temperature-sintered, multi-layered substrates integrated with built-in electrodes and resistors.

In the samples thus produced in these examples, through-holes were formed at predetermined positions so that the inner resistors and other parts could be electrically connected with each other.

The resistance value of each resistor thus formed was measured. The data obtained are shown in Table 1 above, in which the sample numbers with (*) are comparative examples not falling within the scope of the present invention.

It is understood from Table 1 that the samples of the resistance material composition of the present invention gave practicable resistors having desired resistance values.

In the above-mentioned examples, one of Ti, Mo and W was used but this is not limitative. It is also possible to use two or more of Ti, Mo and W in combination.

In the above-mentioned examples, a B—Si—Ba—Ca—Al glass frit containing K$_2$O and Nb$_2$O$_5$ and having the composition mentioned above was used. This also is not limitative. Apart from this, it is also possible to employ other glass frits having different compositions and other glass frits additionally containing other components.

Needless-to-say, the present invention is not whatsoever restricted to the examples mentioned hereinabove but can include any other various changes, applications and modifications which do not overstep the scope and the spirit of the invention.

As has been described in detail hereinabove, the resistance material composition of the present invention consists essentially of at least one resistance material which is of Ti, Mo and W and contains an inorganic binder (for example, at least one of B—Si—Ba—Ca—Al glass frit, and composition oxides that are common to the ceramic substrate to which the composition of the invention shall be applied in about the same ratio as those constituting the substrate, etc.), and this can form resistors having varying resistance values. Therefore, by varying the mixing ratio of the inorganic binder to the resistance material within a predetermined range, it is possible to form resistors having any desired resistance values without worsening the other characteristics of the resistors.

In addition, since the resistance material composition of the present invention can be baked in a neutral or reducing atmosphere and since it can be baked along with a multi-layered ceramic substrate (such as low-temperature-sintering, multi-layered substrates, etc.) while being disposed on the substrate to thereby form resistors on the substrate (that is, to form built-in resistors on the substrate), it is possible to produce small-sized circuit boards, using the composition of the invention, and to reduce the production costs of such circuit boards by simplifying the process of producing the multi-layered ceramic substrate, especially low-temperature-sintering, multi-layered ceramic substrates to which the composition of the invention is applied.

Moreover, since the resistors to be formed from the resistance material composition of the present invention can be integrated with the multi-layered ceramic substrate in the form of built-in resistors, the durability of the resistors formed is advantageously increased.

Furthermore, when the resistance material composition of the present invention comprises the resistance material and the inorganic binder in a ratio by weight of from about 50 to 100 parts of the resistance material to from 0 to about 50 parts of the inorganic binder, it is possible to surely form resistors of the composition having desired resistance values with low-temperature-sintering, multi-layered substrates integrated with Cu electrodes, etc. Employing this embodiment of the present invention, it is possible to more reliably ensure the advantages of the invention.

Moreover, when the resistance material composition of the present invention comprises, as the inorganic binder, a combination of B—Si—Ba—Ca—Al glass frit and composition oxides that are common to the ceramic substrate to which the composition of the invention shall be applied at a ratio nearly the same as those constituting the ceramic substrate, it is possible to surely form resistors of the composition having desired resistance values without worsening other characteristics of the resistors formed. Employing this embodiment of the present invention, it is possible to more reliably ensure the advantages of the invention.

The resistance material composition of the present invention is not limited relative to the kind of the ceramic substrate to which the composition shall be applied to form resistors. However, if the composition is applied to low-temperature-sintering substrates, for example, the above-mentioned substrate A or substrate B, to form resistors, it can be sintered along with the substrates and resistors with good characteristics can be formed. Therefore, this embodiment of the present invention is especially advantageous.

While the invention has been described in detail and with reference to specific embodiments thereof, it will be apparent to one skilled in the art that various changes and modifications can be made therein without departing from the spirit and scope thereof.

What is claimed is:

1. A resistance material composition consisting essentially of, in combination, an inorganic binder and at least one resistance material selected from the group consisting of Ti, Mo and W, wherein said inorganic binder is a glass in combination with composition oxides which are BaO, $Al_2O_3$, $SiO_2$ and either (a) CaO and $B_2O_3$ or (b) SrO and ZrO and wherein the ratio of the resistance material to the inorganic binder is such that the resistance material is from about 50 to less than 100 parts by weight while the inorganic binder is from more than 0 to about 50 parts by weight.

2. The resistance material composition as claimed in claim 1, wherein the ratio of resistance material to inorganic binder is about 60 to 80 parts by weight: about 40 to 20 parts by weight.

3. The resistance material composition as claimed in claim 1, wherein the amount of said composition oxides based on the total weight of said oxides is either (a) about 30% by weight of BaO, 5% of $Al_2O_3$, about 60% by weight $SiO_2$, about 2% by weight of CaO and about 3% by weight of $B_2O_3$ or (b) about 15% by weight of BaO, about 15% by weight of SrO, about 30% by weight of $SiO_2$, about 30% by weight of ZrO and about 10% by weight of $Al_2O_3$.

4. A resistance material composition according to claim 1, in which the resistance material is Ti.

5. A resistance material composition according to claim 1, in which the resistance material is Mo.

6. A resistance material composition according to claim 1, in which the resistance material is W.

7. A multilayered substrate comprising a plurality of juxtaposed layers of ceramic in which at least one pair of adjacent ones of said layers has a resistance material according to claim 1 therebetween and at least one of said layers has a metallic electrode thereon.

8. The substrate of claim 7 wherein the glass of the inorganic binder is a B—Si—Ba—Ca—Al glass frit, the ceramic layers are comprised of the composition oxides, and wherein the ratio of the composition oxides to each other in the inorganic binder is about the same as the ratio of the oxides to each other in the ceramic layers.

9. The substrate of claim 7 wherein each of said plurality of layers is a ceramic sinterable at a temperature of not higher than about 1000° C.

10. A multilayered substrate comprising a plurality of juxtaposed layers of ceramic wherein at least one pair of adjacent ones of said layers has a resistance material according to claim 2 therebetween and at least one of said layers has metallic electrode thereon.

11. The substrate of claim 10 wherein the glass of the inorganic binder is a B—Si—Ba—Ca—Al glass frit, the ceramic layers are comprised of the composition oxides, and wherein the ratio of the composition oxides to each other in the inorganic binder is about the same as the ratio of the oxides to each other in the ceramic layers.

12. The substrate of claim 11 wherein each of said plurality of layers is a ceramic sinterable at a temperature of not higher than about 1000° C.

13. The substrate of claim 10 wherein each of said plurality of layers is a ceramic sinterable at a temperature of not higher than about 1000° C.

* * * * *